(12) United States Patent
Sherman

(10) Patent No.: US 6,562,243 B2
(45) Date of Patent: May 13, 2003

(54) SYNERGISTIC COMBINATION OF METAL IONS WITH AN OXIDIZING AGENT AND ALGAECIDE TO REDUCE BOTH REQUIRED OXIDIZING AGENT AND MICROBIAL SENSITIVITY TO FLUCTUATIONS IN OXIDIZING AGENT CONCENTRATION, PARTICULARLY FOR SWIMMING POOLS

(76) Inventor: Jonathan Sherman, 1126 Brentwood Point Dr., Brentwood, TN (US) 37027

( * ) Notice: Subject to any disclaimer, the term of this patent is extended or adjusted under 35 U.S.C. 154(b) by 0 days.

(21) Appl. No.: 09/828,566

(22) Filed: Apr. 5, 2001

(65) Prior Publication Data

US 2002/0144958 A1 Oct. 10, 2002

(51) Int. Cl.⁷ .................................................. C02F 1/72
(52) U.S. Cl. ...................... 210/754; 210/764; 210/169; 210/198.1; 210/908; 205/745
(58) Field of Search .................. 210/754, 764, 210/765, 169, 198.1, 908; 205/745

(56) References Cited

U.S. PATENT DOCUMENTS 5,332,511 A * 7/1994 Gay et al.
5,993,753 A * 11/1999 Davidson
6,224,779 B1 * 5/2001 Spector
6,287,450 B1 * 9/2001 Hradil
6,328,900 B1 * 12/2001 King

* cited by examiner

Primary Examiner—Betsey Morrison Hoey
(74) Attorney, Agent, or Firm—Fuess & Davidenas (57) ABSTRACT

A water purification system and method suitable for use in swimming pools, spas, hot tubs, water storage tanks, wells and water cooling towers adds (i) an oxidizing agent, preferably granulated or caked chlorine, (ii) metal ions, preferably silver from a galvanic cell having a silver anode electrically connected to a cathode made from a metal of still higher electrochemical potential, normally platinum, and, optionally (iii) an algaecide, preferably chelated copper and/or phosphate-removing compound, and/or (iv) a phosphate-reducing compound, all in synergistic combination. The galvanic cell is preferably some tens of square centimeters in size and some tens of grams in weight, thereby liberating sufficient silver or copper ions so as to aid in treating a multi-thousand liter body of water, such as a swimming pool, for, typically under normal contamination, some weeks to months until the anode is consumed. Copper and/or silver ions liberated from the galvanic cell cooperate with oxidizing agent to suppress bacterial, fungal and/or algae growth, particularly when new supply of oxidizing agent ceases for a prolonged time, normally >2 days. The (i) amount of chlorine, bromine or other chemicals needed to maintain water quality is thus significantly reduced to the greatly enhanced comfort of bathers while the (ii) time during which recovery can graciously be made from an exhausted supply of oxidizing agent is usefully extended.

26 Claims, 7 Drawing Sheets

PRIOR ART

FIGURE 5

FIGURE 5a
Top View

Cross-Section A

Top View

Cross-Section B    FIGURE 6b

SYNERGISTIC COMBINATION OF METAL IONS WITH AN OXIDIZING AGENT AND ALGAECIDE TO REDUCE BOTH REQUIRED OXIDIZING AGENT AND MICROBIAL SENSITIVITY TO FLUCTUATIONS IN OXIDIZING AGENT CONCENTRATION, PARTICULARLY FOR SWIMMING POOLS

BACKGROUND OF THE INVENTION

1. Field of the Invention

The present invention generally concerns water purification systems, and the packaging of water purification chemicals and chemical systems.

The present invention particularly concerns the purification of water in swimming pools, spas, hot tubs, water storage tanks, wells and water cooling towers, particularly by use of galvanic cells in order to inhibit the growth of bacteria, fungus and algae while significantly reducing the amount of chemicals (chlorine, bromine, hypochlorite, persulfate, ozone, etc.) necessary to maintain water quality.

The present invention still more particularly concerns a synergistic combination of metal ions, as may arise from a galvanic cell, with an oxidizing agent and an algaecide in order to reduce both (i) the required effective amount oxidizing agent and (ii) sensitivity to fluctuations in oxidizing agent concentration, particularly for swimming pools and spas.

The present invention still more particularly concerns a packaging of (i) a galvanic cell producing metal ions, (ii) an oxidizing agent and (iii) an algaecide, particularly for swimming pools and spas.

2. Description of the Previous Art 2.1. Water Purification

One of the main functions of water treatment is to destroy harmful microorganisms. (Other functions include removal of minerals, hydrocarbons, and volatile organic compounds, or VOCs). This destruction of microorganisms is usually accomplished by adding oxidizing agents such as chlorine, iodine and/or oxygen. In swimming pools and spas, the treatment of water to eliminate microorganism contamination ordinarily incorporates chemical treatment in combination with a mechanical filtering usually accomplished by drawing water from the pool with a pump, forcing it through a filter and returning it to the pool. Because the mere addition of a quantity of a chemical in liquid or soluble form permits the circulation system to effectuate quick dispersal, sanitization treatment is an easy task. Chlorine is typically used as a sanitation agent. However, chlorine is malodorous, rather inefficient, unhealthful, and not particularly economical.

At ordinary temperatures, chlorine is a gas, difficult to handle, and is not generally available. Accordingly, chlorine used in pools and ponds is combined with some compound that dissociates upon addition to pool water. Chlorine is popularly introduced as a constituent of calcium hypochlorite, sodium hypochlorite, chlorinated isocyanurates, or some other acid, or as a salt. If added as a salt, additional chemicals are required to avoid harmful accumulations of any other constituents of the salt, resulting in the problematic requirement of maintaining a chemical balance.

The process of purification of pool water using electrolysis has already been developed, and is well known in the art. Shindell, in U.S. Pat. No. 4,328,084 (1982) describes a water purification system employing salt in quantities sufficient to make the water slightly conductive and circulating that water through the electric field between a pair of dissimilar metal plates in order to dissociate salt ions from the water. The dissociated ions of salt and water are converted to oxidizing agents capable of destroying organic matter, which is converted to substances that can be removed by mechanical filtration. The process reportedly results in economical and effective purification. However, a major problem arises when a purification cell is placed in the circulation piping. The pump must operate continuously to maintain an effective level of chlorine or oligodynamic ions. This is not a problem in large commercial pools, however, in residential pools, the cost of continued operation becomes prohibitive. Also, governmental restrictions apply and costs of installation are high.

Metallic ions are known to kill or control algae and bacteria. It is well established that silver and copper ions are effective bactericides and algaecides. Treatment with silver has been used by NASA to purify water on the Apollo space missions. The practice of using silver and copper vessels to improve water quality dates back to ancient times. Ancient Phoenicians stored wine in silver urns to preserve it, providing one the earliest recorded examples of use of this metal for that purpose. Zinc, aluminum, and gold ions are just a few additional metals that can be used similarly.

Dahlegren, U.S. Pat. No. 4,337,136, (1982), purifies pool water by using a pair of silver-copper alloy electrodes extending from a floating container. Electrical energy is provided by a battery, using a timer switch that reverses the current as required to reduce erosion of the electrodes. The operating life of such a cell is limited by the requirement of batteries.

Sherman, in U.S. Pat. No. 5,085,753, describes a water purifier with a buoyant housing for supporting a purification cell below the water's surface and for supporting a solar cell array for providing power for the purification cell. The cell operation includes electrolytic processes, electrocution and oxidation to destroy bacteria and algae.

There are two types of undesirable elements in pool water: 1) impurities in suspension, in the form of precipitates or colloids, and 2) dissolved, extremely small, electrically charged impurities in the ionic state. To eliminate these impurities, flocculation processes—consisting of introducing a reactant into the water to create colloids with adsorption properties—have been used. The colloids cause flocculation, which encloses the impurities in suspension. Large particles are formed and are separated from the water by filtering. To facilitate flocculation, the pH of the water has to be adjusted, in many cases, to below 7.4 or above 8.5.

2.2. Water Purification with Metal Ions

Conventional metal ion water purification devices use either (i) an excess of anodic reaction products, (ii) a particular linear relationship between purification cell current and treated water temperature, (iii) addition of sodium persulfate to water in which copper and silver ions have been added from copper-silver electrodes immersed in the water, or (iv) addition of salt in sufficient quantities to make the water slightly conductive followed by circulating the slightly conductive water through an electric field between a pair of electrode plates. These conventional devices and methods have generally been uneconomical and inefficient, and have focused on producing and regulating a DC current from an AC power source so as to maintain the safety of swimmers. The equipment is expensive, complicated and generally requires special installation and monitoring, thereby increasing manufacturing, operating and liability insurance costs.

Solar powered purification cells can overcome some of these problems, However, other drawbacks such as excessive gassing, corrosion, and accumulation of scale and deposits at the purification cell electrodes, result in reduced efficiency, destruction of the cell and/or the necessity of repetitively cleaning the electrodes.

In U.S. Pat. No. 5,279,748, issued to Hackett, water is passed through an "electrolytic filter" consisting of packed granules of copper and zinc, or "a copper-zinc filter media." "As water passes through the electrolytic granules, a chemical reaction causes metal hydroxides to form in controlled amounts. These controlled releases of oxides are carried into the [previously and otherwise] filtered water where they kill bacteria and provide a hostile environment for algae and fungus growth." The amount of ionized metal entering the pool is controlled by varying the flow rate of water entering the electrolytic filter independent of the physical straining filter. The electrolytic filter is impervious to the bacterial growth to which similar filters (composed of other materials) can be susceptible. Hackett's device is claimed to eliminate the need for chlorine.

U.S. Pat. No. 4,492,618 to Eder discloses a method in which electrodes of a copper-silver alloy are dissolved in the treated water via the application of a periodically reversed direct current. The electrically induced dissolution of the electrodes liberates copper and silver ions into the water. Sodium persulfate is added to the water for the "oxidation of organic matter."

In U.S. Pat. No. 4,608,247 issued to Heinig, silver is deposited on a large surface area support and combined with carbon to produce a composition favorable to the dissolution of silver ions in water.

In U.S. Pat. No. 5,352,369, also issued to Heinig, a method is described in which silver deposited on a large surface area alumina matrix acts as a catalyst "in the presence of oxygen to form an active oxidizer in the water." This active oxidizer is claimed to be effective in the containment of bacterial and algal growth.

LeMire, in U.S. Pat. No. 4,935,116, describes a device consisting of concentric cylinders of dissimilar metals (copper and silver) that are electrically connected, with provisions to pass water to be treated in the annulus of said cylinders. The dissimilar metals form a voltaic cell whereby the metals are eroded to supply copper and silver ions to the water.

Finally, the preferred method and device for emitting metal ions in the method and system of the present invention is shown in predecessor U.S. patent application Ser. No. 09/237,553 filed on Jan. 26, 1999, for an APPARATUS AND METHOD FOR PURIFYING WATER WITH AN IMMERSED GALVANIC CELL, which patent application issued as U.S. Pat. No. 6,287,450 on Sep. 11, 2001. The contents of this predecessor patent incorporated herein by reference.

2.3. Silver-Based Water Purification

Silver-based water purification systems offer the most reliable and cost-effective alternatives to chlorine, a chemical that is increasingly criticized for the carcinogenic byproducts it leaves in water. Because of increasing pollution, utilities are forced to put far more chlorine into the supply chain. Recently, chlorine has been shown to produce by-products linked to cancer in laboratory animals, prompting an immediate US government review. These same byproducts have been generated by chlorination for a long time, but never in the quantities that are now being seen.

In Britain, silver ionization is being developed for mainstream water systems. Capitalizing on silver's long-known biocidal properties and safety factors, the Institute of Water Ionization Technologies, UK, has developed silver ion generators for municipal water supplies. A recent project to study the control of Legionnaires disease by using silver ions was funded by the UK Department of the Environment. The disease is named after *Legionella pneurnophilia*, an organism that is widespread in small quantities within natural water sources. The bacteria is lethal at a water temperature of 95° F., but can be killed at temperatures between 135 and 140° F. Of the methods tested, silver/copper ions in soft water were found to be most effective. The copper ion disrupted the enzyme structures of the cell, allowing the silver ion to penetrate inside, where it rapidly inhibited the cell's life support system.

U.S. regulations allow a silver level of 100 ppb in drinking water, but a silver level of only 20 ppb kills Legionella. A proposed European Union Drinking Water Standard has removed any upper limit for silver in drinking water, following the World Health Organization's Guidelines for Drinking Wafer Quality, which determined that it is unnecessary to recommend any health-based guidelines for silver, as it is not hazardous to human health. Silver ion generators are currently being used in intensive care and heart transplant units of hospitals, and for poultry processing, engineering, brewing, cooling towers and swimming pools.

According to the most recent research on the swimming pool industry, published in 1993 by the National Spa and Pool Institute, 6.6 million individuals in the United States own pools, 3.4 million of which are in-ground and 3.2 million are aboveground. NSPI estimates that approximately 160,000 in-ground pools are built annually in the United States, in addition to about 475,000 aboveground pools. Silver-based mechanisms for keeping swimming pools sanitized are gaining widespread popularity among pool owners preoccupied with the mounting health hazards of chlorine.

Silver-copper ion systems have sanitized tens of thousands of swimming pools worldwide for several decades, inactivating organisms including *Bacillus typhous, Legionella pneumophila* and *E. coli*. Copper ions in the system have eliminated unwanted algae growth in pools, and have supplemented silver in controlling other pathogens, such as the polio virus. The technology works by producing positively charged ions that attack and destroy the negatively charged cells of organisms like bacteria and algae.

The purification method named the number one alternative to chlorine, based on research conducted by Swimming Pool and Spa Age magazine, is a silver catalyst system that has the capacity to instantly destroy bacteria and viruses. The system deposits silver microcrystals on the inside of a flow-through cartridge, which feeds oxygen into the water flow. The oxidized silver destroys bacteria, viruses and organic matter. Tests performed by the U.S. Environmental Protection Agency (EPA) at the University of Arizona, for example, found that the cartridge reduced the presence of *E. coli* in water by 99.96 percent within five seconds.

The use of silver in swimming pool sanitation is growing because of the many other advantages these systems offer. Silver systems are less expensive operationally than chlorine and other chemical systems. Also, silver does not evaporate from the water leaving the pool unprotected and does not stain the skin or bleach clothing.

2.4 Galvanic Cells

The predecessor U.S. patent application Ser. No. 09/237, 553 filed on Jan. 26, 1999, for an APPARATUS AND METHOD FOR PURIFYING WATER WITH AN IMMERSED GALVANIC CELL shows a preferred means for liberating metal, specifically silver, ions during water treatment.

It is known by chemists and by practitioners of the water purification arts that each metal has its own electrochemical potential. Additionally, it is known that when two dissimilar metals, each with different electrochemical potentials are immersed in a conductive solution and electrically connected together, a galvanic cell or battery will be formed; such that current will flow from the metal of lower electrochemical (anode) potential to the metal of high chemical potential (cathode). Moreover, it is known that the metal of lower electrochemical potential will be dissolved into the electrolyte at a rate proportional to the current flowing between the two electrodes. This process transpires when a strip of a metal such as silver is immersed in water containing ionic species. A strip of another metal, such as platinum, is immersed in the water and is electrically connected to the silver strip, commonly by wire via an ampere meter. Current flows from the silver strip through the wire and ampere meter to the platinum strip due to the potential difference between the two metals. At the surface of the silver strip metallic silver atoms lose electrons to form silver ions. The electrons liberated by the oxidation of metallic silver flow through the electrical connection between the two metals, comprising a current which can be detected by the ampere meter. At the surface of the platinum electrons typically react with oxidizing species, such as hypochlorite ions.

A galvanic cell is a simple and effective means of introducing small quantities of beneficial metal ions into water. What has been misunderstood by previous investigators (LeMire and Hackett) is that the metal of higher electrochemical potential is cathodically protected by the flow of current in the galvanic cell and is therefore inhibited from dissolving. In fact, this effect is exploited in galvanized steel and in other applications such as the use of a sacrificial zinc electrode for underground tank and marine applications. Therefore, the devices described by LeMire and Hackett will only be effective in dissolving the metal of lower chemical potential. Silver, which has a relatively high electrochemical potential, will not be appreciably dissolved.

SUMMARY OF THE INVENTION

The present invention is based on the discovery that the operationally effective amount of a chemical oxidizing agent (s), normally chlorine, used to preclude microbial activity in the water of a pool, spa, or the like can be reduced, normally by a factor of at least two times (×2) and more commonly from three to four times (×3-×4) by combination with an economic small amount of metal ions, normally silver. An algaecide (such as chelated copper) and/or a phosphate-removing compound (such as No Phos made by Natural Chemistry of Stamford, Conn.) is also strongly preferably present for maximally effective treatment using but minimal quantities of, in particular, the chemical oxidizing agent (the chlorine).

The present invention is also based on the further discovery that following a reduction in the concentration of a chemical oxidizing agent(s), normally chlorine, below an operationally effective level, economic small amounts of metal ions, normally silver, greatly increase the period of time elapsing before microbial growth increases, normally by about 48 hours (2 days) for a typical pool, spa or the like. This time elapsing before the water within the pool or spa becomes so greatly contaminated that recovery is difficult, requiring copious chemicals, can be extended when the normal treatment with and by the chemical oxidizing agent (s) (the chlorine) is, both at a time before interruption of this treatment and continuing after interruption, supplemented with an economically small and roughly steady infusion of metal ions, normally silver ions. The combination water treatment using both (i) a chemical oxidizing agent(s), normally chlorine, and (ii) metal ions, preferably silver ions, is also preferably accompanied by (iii) an algaecide such as chelated copper and/or (iv) a phosphate-removing compound. The combination is synergistic in prolongation of the period in which the treated water is protected against an avalanche of microbial growth when further addition of any one treatment agent, most normally and particularly the oxidizing agent (the chlorine), ceases.

Notably, prolongation of the period during which microbial growth is precluded if, for example, the pool or spa runs out of chemical oxidizing agent (chlorine), potentially saves—if the oxidizing agent is timely restored (i.e., within 48 hours)—a great deal of the chemical oxidizing agent, and much more than such amount as would simply make up for arrearage in application of the chemical oxidizing agent. This is because once microbial growth spikes due to inadequate water treatment, then extraordinary amounts of chemical oxidizing agent(s) and/or other chemicals and treatments are thereafter required to bring the growth under control, and to restore the treated water to satisfactory condition. Although it is far superior to keep the water of a pool, spa or the like constantly treated with microbial growth controlled, this is difficult with such constant monitoring and intervention as proves difficult for amateurs who may neglect or be absent from their pools and spas. It is very useful to any person attending to the maintenance of the pool or spa—and particularly to a non-professional maintainer such as, for example, a homeowner—to have the period extended in which action may permissively be taken, in response to measurement of insufficient pool or spa chlorine concentration, to restore adequate chlorine levels.

It should further be understood that reduction in the level of chemical oxidizing agent(s), normally chlorine, required for effective treatment of water in a pool or spa is highly desirable not only on economic and environmental grounds, but so that irritation of the eyes, skin and mucous membranes of bathers may be reduced. The reduction in the required effective level of chemical oxidizing agent(s), normally chlorine, achieved by the present invention is very dramatic: the (treated) waters of a pool or spa become like as a clean river, with the smells and irritation for which swimming pools are renown being greatly abated or even totally absent.

1. Theory of the Invention

An inventor cannot be held to positively know the theory of his invention, it being sufficient to demonstratively show that the invention works to realize a useful effect. Moreover, and despite an extensive search of the literature, the operative effect of metal ions in the preclusion of microbial growth is poorly understood.

However, it is hypothesized that a measurable synergism is occurring in the water treatment method of the present invention from a combined use of (i) a chemical oxidizing agent (s), normally chlorine, and (ii) metal ions, normally silver, including with the further optional, but preferred, addition of (iii) an algaecide, and/or (iv) a phosphate-removing compound. The method of the present invention for the treatment of the water in pools and spas and the like is perceived to be synergistic because each treatment element is most effectively doing something slightly different.

The oxidizing agent (s), normally chlorine, is perceived not only to oxidize microorganisms directly, but also to oxidize organic contaminants in the water, removing these organic contaminants and thereby robbing microorganisms including both bacteria and algae of their food source.

Clearly when the oxidizing agent(s) is (are) completely consumed, and are no longer present, then the organic contamination level of the water rises unobstructed.

Regardless of how metal ions actually work to impair the growth of microbial organisms, no one appears to think that this is because the metal ions oxidize the organic food sources of the microorganism. The metal ions are far too few, and too sparse, to operate by this route. It is more likely that they somehow interfere with the normal development and/or life processes, potentially including reproduction, of microorganisms, notably bacteria. (Certain theories judged credible by the inventor find that metal ions interfere with membrane wall of the bacteria. Perhaps it should also be contemplated that metal ions, when added to microbe-containing solutions, show themselves not to be "instant killers", but need some "contact" time to do their work.) It is difficult to treat water with significant organic nutrients by use of metal ions alone; life is difficult to suppress where abundant food exists, and whatever prophylactic effect metal ions have can be overwhelmed in a pool or spa that is laden with organic nutrients. Indeed, if organic contamination is sufficiently large, then the presence of even quite large amounts of metal ions is difficult, or even impossible, to detect in the measurement of microbial growth.

Putting these reasonably hypothesized characteristics of (i) oxidizing agents and (ii) metal ions together gives a colorably reasonable theory of the operation of the present invention. The oxidizing agent(s) oxidizes organic contamination in the water, robbing opportunistic microorganisms of any food source, for so long as the oxidizing agent(s) are present. When the oxidizing agent is consumed, then organic contamination commences to rise, and microbial life attempts to take hold. With the food supply still modest, this microbial life can multiply but slowly, which provides adequate time for interference with the growth/development and/or reproduction of the microbial life by any metal ions that are present. The metal ions (in reasonable concentration) thus "hold off" such a "cascade" into microbial contamination as will, if the organic levels keep building, ultimately inevitably transpire. The metal ions would be expected to delay an "explosion" in the abundance of microbial life, but not permanently prevent it; and this is exactly what is observed.

In this context the effect of any presence of an algaecide and/or a phosphate-removing compound, strongly preferred in the present invention, can also be hypothesized. The silver and zinc ions are better at interfering with the growth and/or reproduction of bacteria than of algae. A low level of algaecide keeps algae from commencing untrammeled growth and reproduction as soon as a food source (and light) becomes present. The phosphate-removing compound deals with a particular component—phosphate—of the microorganisms' food supply, and delays and obstructs the growth of microorganisms by depriving them of this essential element.

2. A Method of Treating the Water of a Pool or Spa

Accordingly, in one of its aspects the present invention is embodied in a method of treating the water of a pool or spa receiving ongoing organic contamination.

The method consists of introducing at predetermined rate each of (i) a chemical oxidizing agent, and (ii) metal ions.

An amount of (i) the chemical oxidizing agent introduced into the water is insufficient to inhibit the growth of bacteria without the presence of (ii) the metal ions. However, the same amount is perpetually sufficient to inhibit the growth of bacteria in continuing presence of (ii) the metal ions.

Meanwhile an amount of (ii) the metal ions introduced into the water is sufficient to temporarily inhibit the growth of bacteria should introducing of the chemical oxidizing agent cease, and after such time as previously introduced chemical oxidizing agent is effectively completely consumed. However, the metal ions are then so effective only for a period of time, which period is at least twice as long as would otherwise be the case should the metal ions have never been present. The period is not perpetual, bacteria ultimately growing in absence of the chemical oxidizing agent despite the continuing introduction and the continuing presence of the metal ions.

Thus the concept of the invention is this: (i) the chemical oxidizing agent, and (ii) the metal ions are each present in the treated water in such effective amounts as will permit that (ii) the metal ions, when and while still persisting (as is normal) in the treated water, will extend by at least two times the period in which growth of bacteria—which will inevitably occur—will be inhibited if and when the introduction, and the persistence, of (i) the chemical oxidizing agent ceases.

Indeed, the introducing of (ii) the metal ions into the water is preferably sufficient to inhibit the growth of bacteria for at least twenty four hours, and more commonly forty-eight hours, after introducing of the chemical oxidizing agent ceases, and after a time when previously introduced chemical oxidizing agent is effectively completely consumed. This twenty four or forty-eight hour period is at least twice as long as would otherwise be the case should the metal ions have never been present. The exact quantity of metal ions introduced is a function of the volume of water treated, and the rate of its organic contamination. However, this specification disclosure will show metal-ion-producing galvanic cells, including as are packaged with dispensers of oxidizing agent (e.g., chlorine), that are broadly suitable to treat common private residential pools and spas to this standard.

The introducing may still further, preferably, be of (iii) an algaecide and/or (iv) a phosphate-removing compound. The amount of (iii) the algaecide introduced into the water is sufficient to inhibit the growth of algae should introducing of the chemical oxidizing agent cease, and after such time as previously introduced chemical oxidizing agent is effectively completely consumed. The amount of (iv) the phosphate-removing compound introduced into the water is also sufficient to inhibit the growth of algae should introducing of the chemical oxidizing agent cease, and after such time as previously introduced chemical oxidizing agent is effectively completely consumed. However, each substance is then so effective only for a period of time: which period is, however, usefully longer than would otherwise be the case should the substance have never been present. The period is, however, not perpetual; algae and/or bacteria ultimately growing in absence of the chemical oxidizing agent despite continuing introducing and continuing presence of any and all of (ii) the metal ions, (iii) the algaecide and/or (iv) the phosphate-removing compound.

In the preferred water treatment method the introducing is of metal ions preferably consisting essentially of silver and copper and zinc, and more preferably silver.

These silver metal ions are preferably derived from a galvanic cell having (i) a first metal drawn from the group of silver and copper and zinc, in physical and electrical contact with (ii) a second metal having a higher electrochemical potential than does the first metal, both metals being immersed in the water rendered electrically conductive by the presence of ions.

In the preferred galvanic cell at least one of the first metal and the second metal is in the form a planar mesh while the other metal is in a planar form laid flat against the mesh. By this construction openings within the at least one metal mesh permit circulation of water so that ions may readily come into contact with both the first and the second metals where there is little distance between them. Meanwhile, an effective amount of the first metal is liberated into the water so as to inhibit the growth of bacteria, fungi and algae by galvanic action When the introducing is of silver metal ions, as is preferred, then the second metal of the galvanic cell preferably consisting essentially of a metal of the platinum group.

In the preferred water treatment method the introduced chemical oxidizing agent is preferably drawn from the group consisting essentially of chlorine and/or bromine. The most preferred oxidizing agent is sodium dichlor-S-triazinetrione dihydrate sufficient in quantity so as to produce a chlorine ion concentration of 0.2 to 1.0 ppm. Equivalent concentration of bromine ions is from 2–4 ppm. In either case the concentration is low by past standards: pools and the like are normally maintained at from 1–3 ppm chlorine ion concentration.

The preferred introducing of silver metal ions preferably derived from the galvanic cell is into chlorinated/brominated water rendered electrically conductive by the presence of chlorine and/or bromine ions. The amount of silver ions present, and the rate of silver consumption, will depend on the size of this galvanic cell, and the concentration of chlorine and/or bromine ions. For treatment of 100,000 gallons water it is normally preferred to use a galvanic cell having a silver matrix of with an apparent total two-sided area of the major surfaces of its foil electrodes on the order of 12.5–200 $cm^2$. The "apparent" area of these foil surfaces is not the actual total area because the surfaces may be perforated and/or possessed of substantial roughness. However, the basis of the measurement is clear enough: it is simply the two-sided area of the foils. A generally preferred galvanic cell consists of a 5 cm by 7 cm palladium coated perforated steel rectangle acting as support for four 2.5 cm. by 5 cm. silver leaf rectangles enclosed in a flat nylon mesh (thus having a total two-sided foil area of 4 foils×(2.5 cm.×5 cm.)/foil×2 sides=100 $cm^2$). The foils do not occupy much room, and are generally used until any silver component thereof is totally consumed.

The introducing of the chemical oxidizing agent preferably transpires by dissolving a water soluble solid form of oxidizing agent.

The introducing of the chemical oxidizing agent may transpire upstream in the circulating water of the pool or spa from the introducing of the metal ions to promote dissolution of the metal ions.

The introduced algaecide preferably consists essentially of chelated copper and/or compounds of chelated copper. These substances are preferably present, if at all, in only the minimal amounts recommended for pool and spa application by the manufacturer.

The introduced phosphate-removing compound is preferably the No Phos product of Natural Chemistry, Inc. This product is essentially lanthanum carbonate. The preferred quantity for use in 10,000 gallons water in accordance with the present invention is from 1–15 oz. monthly. Just as with the concentration of oxidizing agent, the concentration is low by the manufacturers recommendations: pools and the like are recommended to be dosed with either 16, 32, or 48 oz. No Phos as will generally realize about 300–600; 600–900; or >900 ppm phosphate ion level in 10,000 gallons water.

The chemical oxidizing agent, the metal ions, the algaecide and the phosphate-removing compound may be introduced from physically separate devices each within the circulating water of the pool or spa, or from separate chambers of a single, monolithic and integrated, device.

Accordingly, just as with previous treatment of the water of pools and spas, there is no hard and fast rule, no chemical formula, that says to use from 1–3 parts of substance A, from 2–7 parts of substance B, and so on. Rather, a practitioner of the water control arts will recognize that adjustment of treatment elements, and their concentrations, is a function of the water, and the water purification task, at hand. It is, however, easy to recognize the synergism of the present invention. Literally every treatment chemical, with the possible exception of a chelated copper algaecide if such be present, is present at levels far below recommended effective levels, and sometimes below levels at which any effectiveness at all would be predicted to be had in the prior art. It is especially important that the oxidizing agent, normally chlorine, is used in water treatment at record low levels: the hallmark of the present invention.

3. A Water Treatment Device

In another of its aspects the present invention is embodied in a replaceable consumable device insertable in a recirculation flow path of a pool or a spa, including insertable in a fixed housing plumbed into the recirculation system of a pool or spa or insertable in a dispenser that floats in the pool or spa, for treating the water of the pool or the spa when the pool or spa receives ongoing organic contamination.

The preferred device minimally includes (i) a first dispenser for introducing at predetermined rate a chemical oxidizing agent, and (ii) a second dispenser for introducing at predetermined rate metal ions.

The amount of the chemical oxidizing agent introduced into the water by (i) the first dispenser is insufficient to inhibit the growth of bacteria without the presence of the metal ions, but is perpetually sufficient to inhibit the growth of bacteria in continuing presence of the metal ions as are introduced by (ii) the second dispenser.

Meanwhile, the amount of the metal ions introduced into the water by (ii) the second dispenser is sufficient to inhibit the growth of bacteria should introducing of the chemical oxidizing agent by (i) the first dispenser cease, and even after such time as previously introduced chemical oxidizing agent is effectively completely consumed. However, it is then so effective only for a period of time, which period is at least twice as long as would otherwise be the case should the metal ions have never been present. This extension period is, however, not perpetual; bacteria will ultimately grow in absence of the chemical oxidizing agent despite the continuing introducing and the continuing presence of the metal ions.

In the preferred water treatment device the introducing of the metal ions into the water by (ii) the second dispenser is sufficient to inhibit the growth of bacteria for at least twenty four hours after introducing of the chemical oxidizing agent by (i) the first dispenser ceases, and even after a time when previously introduced chemical oxidizing agent is effectively completely consumed. This twenty four hour period at least twice as long as would otherwise be the case should the metal ions have never been present.

The most preferred water treatment device further includes (iii) a third dispenser for further introducing an algaecide and/or a phosphate-removing compound, or even a (iv) a fourth dispenser for further introducing the remaining one of the algaecide and/or the phosphate-removing compound. The amount of the algaecide, and/or the phosphate-removing compound introduced into the water by this (these) optimal third (and fourth) dispenser(s) is sufficient to inhibit the growth of algae should introducing of the chemical oxidizing agent by the first dispenser cease, and even after such time as previously introduced chemical oxidizing agent is effectively completely consumed. However, it is then so effective only for a period of time, which period is longer than would otherwise be the case should the algaecide and/or the phosphate-removing compound have never been present. However, the extension period is not perpetual; algae ultimately growing in absence of the chemical oxidizing agent despite continuing introducing of the metal ions by (ii) the second dispenser.

In the most preferred water treatment device (i) the first dispenser is preferably but a solid form of water soluble chemical oxidizing agent dissolving over time to introduce chemical oxidizing agent into the water.

The preferred (ii) second dispenser is, however, considerably more complex. A galvanic cell having (i) a first metal drawn from the group of silver and copper and zinc, in physical and electrical contact with (ii) a second metal having a higher electrochemical potential than does the first metal, immersed in the recirculating water rendered electrically conductive by the presence of ions, dispenses ions of the first metal.

The optional (iii) third and (iv) fourth dispensers are simple chambers which, however, hold and dispense chemicals that are in amount and dispensing rate strictly in accordance with the combinatorial principles of the present invention where synergism is promoted through balance, and coaction.

4. An Integrally Packaged Water Treatment System

In another of its aspects the present invention is embodied in an integrally packaged water treatment system particularly for use in the flow of recirculating water of a pool or spa.

The preferred water purification system includes (i) a permanent housing with refillable containers containing (ii) a consumable water soluble chemical oxidizing agent, and (iii) a consumable galvanic cell producing metal ions. The (ii) oxidizing agent and (iii) galvanic cell are optionally prepackaged separately or together in a disposable cartridge(s) insertable into and easily removed from the permanent housing. Contrary to previous alliqots of pool chemicals and the like, the chemical oxidizing agent is preferably present in the system in an amount that is intentionally consumed at a time before the galvanic cell is consumed.

The most preferred water purification system further contains an algaecide and/or a phosphate-removing compound, preferably both. In this case the amount of chemical oxidizing agent present is also intentionally consumed before either the algaecide or the phosphate-removing compound (whichever is present) is consumed. Each of the algaecide and/or phosphate-removing compound may also be prepackaged in a disposable cartridge insertable into and easily removed from the (i) permanent housing.

The chemical oxidizing agent preferably consists of a solid form dissolving over time to introduce chemical oxidizing agent into the water.

The galvanic cell preferably includes (i) a first metal drawn from the group of silver and copper and zinc, in physical and electrical contact with (i) a second metal having a higher electrochemical potential than does the first metal, immersed in the recirculating water rendered electrically conductive by the presence of ions.

The algaecide or the phosphate-removing compound (whichever is present) are present in slow-release form, being water purification does not principally rely on these elements, but rather primarily relies on the chemical oxidizing agent and secondarily relies on the metal ions.

These and other aspects and attributes of the present invention—including the nominal quantities and concentrations (which are separate things) of the system components typically delivered into service for typical pools and the like—will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 5, consisting of FIGS. 5a and 5b, are top and cross-sectional side views of a first embodiment of a galvanic cell suitably used in the water treatment system of the current invention.

FIG. 6, consisting of FIGS. 6a and 6b, are top and cross-sectional side views of a second embodiment of a combined galvanic cell and chlorine dispenser suitably used in the water treatment system of the current invention.

FIG. 7, consisting of FIGS. 7a and 7b, are exterior, and x-ray views of a preferred dispenser of chemicals in the water treatment system of the present invention, the dispenser delivering of each of (i) an oxidizer, (ii) a metal ion, and (ii) an algaecide into a pool or spa in accordance with the present invention, the dispenser accepting disposable and consumable chemical cartridges and galvanic cells.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

The present invention particularly concerns the purification of water in swimming pools, spas, hot tubs, water storage tanks, wells and water cooling towers by use of (i) an oxidizing agent, or oxidizer, (ii) metal ions as arise from a galvanic cell, and, preferably also, (iii) an algaecide and/or (iv) a phosphate-removing compound, preferably both. The combination is synergistic: the growth of bacteria, fungus and algae is inhibited while the amount of chemicals, and most particularly the oxidizing agent (chlorine, bromine, hypochlorite, persulfate, ozone, etc.) necessary to maintain water quality is significantly reduced.

As part of the present invention, a two-metal two-electrode galvanic cell is immersed and operated in water rendered electrically conductive by the presence ions of, for example, chlorine. As taught in the predecessor patent application, the anode of the galvanic cell (i) is the metal with the lower electrochemical potential, and work function, and (ii) is sacrificial, liberating metal ions of a type suitable for water purification. The anode metal is typically silver or copper, and the cathode metal a platinum group metal. The metal ions liberated from the galvanic cell serve to inhibit the growth of bacteria, fungi and algae—but insufficiently so as to alone suffice to continuously maintain water purity during normal operational conditions. This is why the oxidizing agent is present: it acts in concert with the ions (and with the algaecide, if any be present) to maintain water purity.

Accordingly, one object of the present invention is an improved water purification system that is capable of removing water-borne micro-organisms from pools, spas, hot tubs, drinking water, and industrial water with a reduced need for chemical disinfectants and oxidizing agents (also known as oxidizers) to maintain satisfactory water quality in the face of ongoing organic contamination (and exposure to life forms including bacteria as is always the case in the out of doors.)

Another object of the present invention is a water purification device that substantially eliminates complicated circuits, hardware, and other unnecessary equipment.

Still another object is to provide considerable energy savings over in-line chlorinators, particularly during times of low or no water contamination.

Yet another object of the invention is scalability in water purification, permitting usage of fewer and/or smaller purification cells in small reservoirs and more and/or larger purification cells in larger reservoirs.

In order to accomplish the aforementioned and other objects, the self-contained, inexpensive water purification system of the present invention is generally suitable for use in all reservoirs of water. The galvanic cell, in particular, requires water that has been rendered electrically conductive by the presence of ions. The galvanic action between dissimilar metals (typically silver and a platinum group metal) immersed in the electrically conducting solution is used, as in the prior art, to liberate metal ions. The metal ions may even be, and most commonly are, the selfsame silver and copper ions long recognized to be safe and effective for purifying water.

However, unlike the prior art, the liberated metal of the galvanic cell comes from its anode, and not its cathode. If the galvanic cell is to function as such, and without any external source of electrical potential, this means that the metal or other material of the cathode must have a greater electrochemical potential, or work function, than does the anode metal. If the anode metal is itself copper, which has a high electrochemical potential, or silver which has a very high electrochemical potential, then this is a demanding requirement. Of all conductive metals, only gold and the platinum group metals have a higher electrochemical potential than does silver, and of these metals only platinum (and, to a lessor extent, palladium) are common.

In the present and related inventions the anode is preferably made of silver, and liberates silver ions. The cathode, which must and does have a higher electrochemical potential, is preferably made from platinum. Because the preferred form of both anode and cathode is as a fine screen mesh with high surface area per volume of metal, very little of each metal (which are both expensive) is used.

The precise mechanism of the biocidal effect of silver ions is not precisely known, nor known with respect to the present invention. Experiments have shown that the amount of silver liberated to the solution is minuscule, and yet, pool trials have found a significant beneficial effect, and pronounced synergism in combination with an oxidizing agent. It is believed that the effect is due to surface-adsorbed silver complexes, rather than dissolved silver in the pool water. Calculations have indicated that only 0.1 to 0.05 grams of silver are required to form an adsorbed monolayer in a typical pool. The occurrence of temporary photosensitive discoloration of the pool or spa surface further evidences the likelihood of surface adsorption of silver.

Accordingly, in accordance with the present invention a water purification device is realized as a combination of (i) an oxidizing agent, (ii) a galvanic cell, and, preferably, (iii) an algaecide. The preferred galvanic cell consists of two metals: 1) a first metal drawn from the group consisting essentially of silver and copper, in electrical contact with 2) a second metal having a higher electrochemical potential than does the first metal. The second metal is most commonly a member of the platinum group, or gold. The device is immersed in the electrically conductive water. An effective amount of both (i) the oxidizing agent, (ii) the first metal (by galvanic action) and, if any be present, (iii) the algaecide and/or (iv) the phosphate-reducing compound are delivered into the water so as to collectively serve to inhibit the growth of bacteria, fungi and algae.

In its preferred embodiment, the water purification device is compactly packaged as an integral assembly. Within the assembly the galvanic cell in particular is preferably assembled as two metal mesh grids, or screens, that are overlaid permanently one upon the other. The two mesh grids—one of which is made of one metal as the anode and the other of which is made of another metal as the cathode of a galvanic cell—are thus in physical and electrical contact with each other over a substantial area. Nonetheless to this substantial area of contact, voids in the mesh grids permit the ready circulation of water and of the ions contained within the water. The device is generally used in water rendered electrically conductive by the presence of chlorine ions, particularly in mass bathing basins including swimming pools, spas, and hot tubs.

The water purification device of the present invention is preferably used in mass bathing basin that has a recirculation system, and is located in line with the flow of the recirculation system. The flow makes in particular that the electrodes of the galvanic cell are continually exposed to new conductive ions in the water, and that the copper or silver ions liberated from the anode are promptly transmitted away and dispersed into the body of water.

In the case of a mass bathing basin having a chlorination point within the recirculation system, the device may be located directly downstream from the chlorination point that is preferably integrally located within the same device, and thus also within the recirculation system. This location makes that the electrodes of the device are not only continually exposed to conductive chlorine ions in the water, but are exposed to these ions at the location of their highest density.

In a most preferred embodiment, a water purification device for use in a swimming pool having a chlorination point within a recirculation system is contemplated. The galvanic cell of the device employs a first grid made of a first metal from the group consisting of silver and copper in electrical contact with a second grid made of a second metal having a higher electrochemical potential than does the first metal. A mechanism for retaining both grids together as a galvanic cell is also contemplated. The galvanic cell device is immersed in flowing water in a position that may be directly downstream from the chlorination point that is preferably within the same device, and that is also within a swimming pool's recirculation system. Therein, by galvanic action, a sufficient amount of the first metal is liberated into water of the swimming pool so as to serve as inhibitor of the growth of bacteria, fungi and algae.

The present invention is also embodied in a method of producing (or liberating) into the recirculation path of a pool, or spa or the like each of (i) an oxidizing chemical, and also (ii) aqueous metal ions, and still further, if optionally present, (iii) an algaecide—by action of all of which the water of the pool or spa is purified. Particularly as concerns the galvanic cell, the method includes immersing, within water that is rendered electrically conductive by the presence of ions, a first metal, drawn from the group of silver and copper, that is in electrical contact with a second metal having a higher electrochemical potential than does the first metal. An effective amount of the first metal is liberated into the water by galvanic action as first metal ions so as to serve, in conjunction with the oxidizing chemical and optional algaecide, as inhibitor of the growth of bacteria, fungi and algae.

Figure 4:
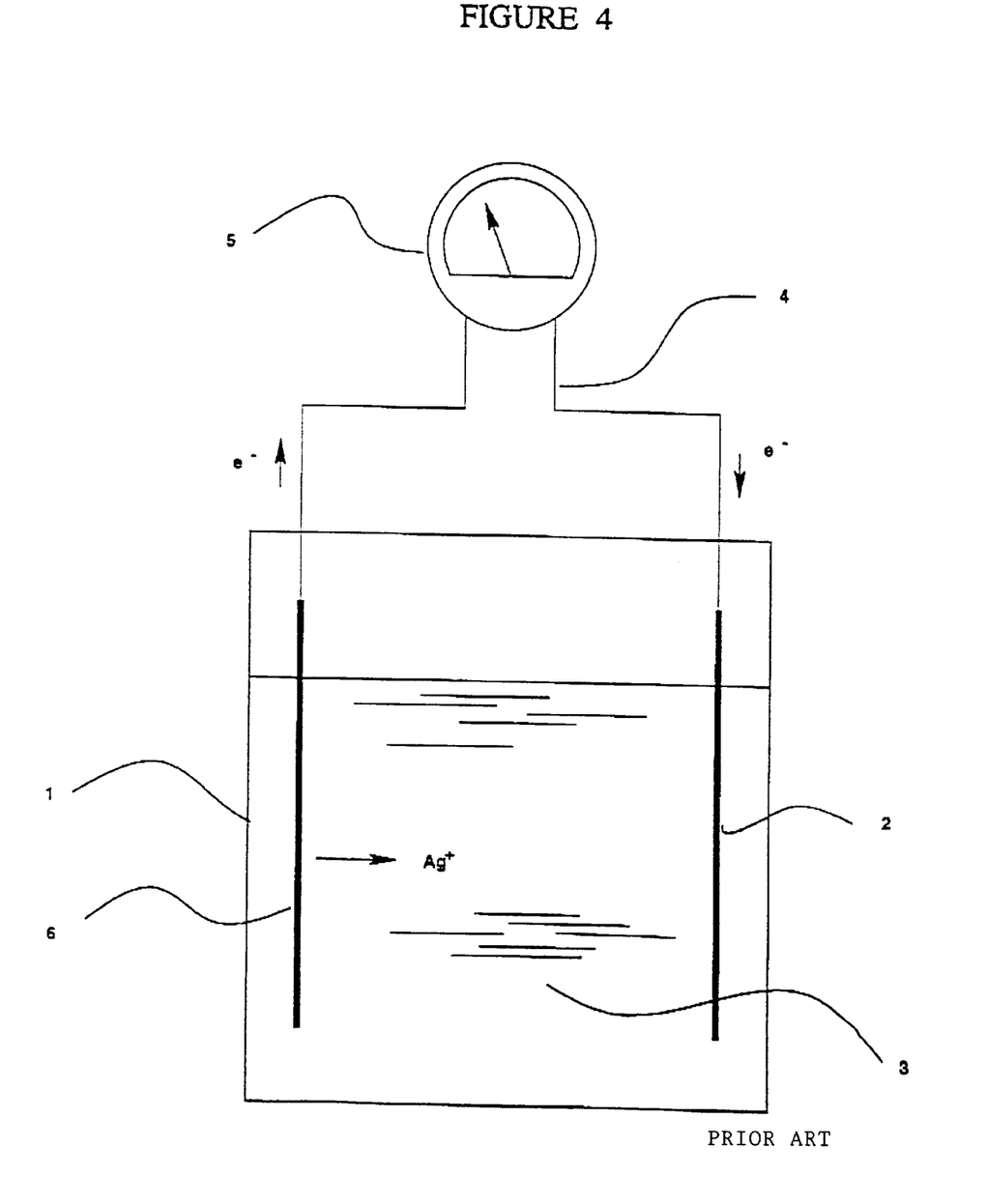
FIG. 4 is a schematic diagram of a galvanic cell having silver and platinum electrodes.

The process of galvanic action within the galvanic cell is illustrated in FIG. 4 where a strip of silver metal (6) is immersed in water containing ionic species (3). A strip of platinum metal is immersed in said water (3) and is electrically connected to the silver strip (6) via an ampere meter (5) and associated wire (4). Current flows from the silver strip (6) through the ampere meter (5) to the platinum strip due to the potential difference between the two metals. At the surface of the silver strip (6) metallic silver atoms lose electrons to form silver ions. The electrons liberated by the oxidation of metallic silver flow through the electrical connection between the two metals, comprising a current which can be detected by the ampere meter (5). At the surface of the platinum, electrons typically react with oxidizing species, such as hypochlorite ions In a preferred embodiment of the present invention, dissimilar metals (typically copper or silver in combination with a platinum group metal or gold) maintained in electrical contact with each other are retained in a container. The container is immersed within a reservoir of water—which water has already been rendered electrically conductive by the presence of ions—that is to be treated. The metals may consist of metal foil, expanded mesh, shot, wire, metal wool, or any other form of metal presenting a large surface area. The dissimilar metals are in electrical contact, thereby, forming a galvanic cell which dissolves over time the metal of lower electrochemical potential (typically copper or silver), consuming over time the anode of the galvanic cell, which is sacrificed. The cathode metal (typically relatively inert gold or a platinum group metal) neither dissolves nor dissipates.

The container may simply be placed below the skimmer basket of the swimming pool or spa, or may be placed anywhere in the body of water to be treated. Alternately, the dissimilar metals in electrical contact with one another may be placed in a chamber through which the water to be treated is circulated by means of a pump. Typically, the device will be a mixed packing of silver metal and a platinum group metal, e.g., palladium). An additional mixed packing of copper and a platinum group metal may be employed to provide copper ions to the water. Furthermore, a mixed packing of copper, silver and a platinum group metal may also be used.

It has also been found that the rate of metal dissolution is greater as the concentration of hypochlorite ions or other oxidizers in the water is increased. It may therefore be desirable to situate the packing of dissimilar metals at the point of chlorination or where other oxidizing agents are added to the pool, a possible drawback to this positioning being that too much metal may thus be liberated causing potential discoloration of downstream surfaces. This positioning may be accomplished by incorporating the dissimilar metals into a chlorine dispenser, thereby exposing the mixed metal packing to the water at point of its highest ionic strength. This device would then provide both chlorine and metal ions to the water to be treated. Alternatively, this can be accomplished by locating the metallic packing in a chamber in-line with the pool or spa recirculation system directly downstream of the chlorination point.

In any case, the metal dissolution rate is increased if the metal packing is exposed to water having higher concentrations of oxidizing ions. It has also been demonstrated that the dissolution rate is dependent on the velocity of the treated water with respect to the metal surface; therefore, it is desirable to enhance the liquid contacting of the device to the water to be treated. It is possible to enhance both the liquid contacting and the concentration of oxidizing ions by combining the galvanic cell with a chlorine dispenser which is recirculating a stream of the water to be treated.

One possible implementation of the invention is a perforated container which incorporates a chamber where a mixed packing of silver and platinum are retained and which further features a chamber where calcium hypochlorite powder or tablets could be held. This container could be placed in or below the skimmer basket or in the inlet strainer of the filtration pump. In this way, both high oxidizer concentration as well as excellent liquid contacting can be maintained.

Figure 1:
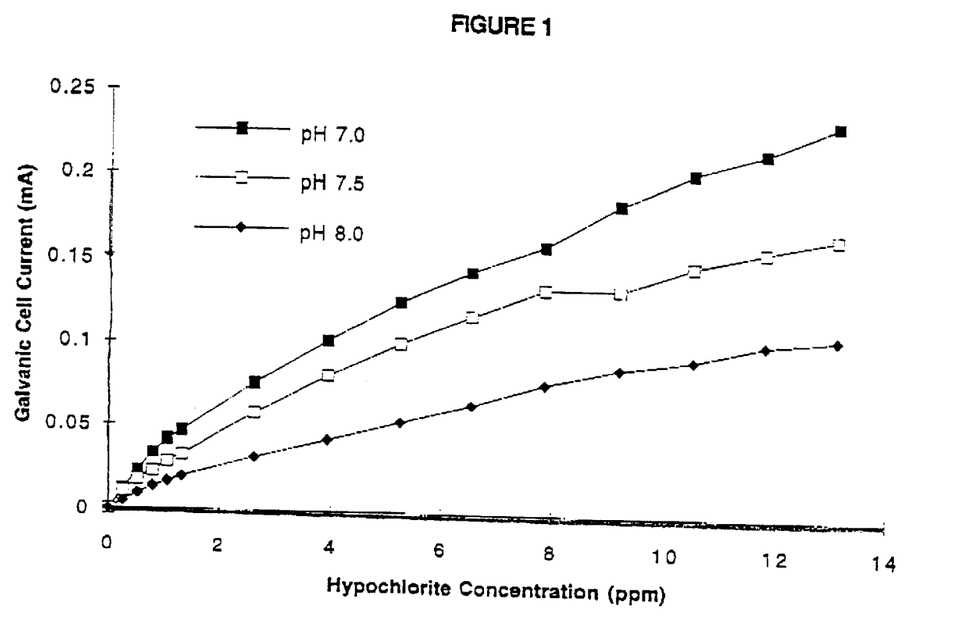
FIG. 1 is a plot of the current between silver and platinum as a function of hypochlorite concentration.

For a first example, a strip of 2.5 cm by 5.0 cm silver metal foil and a 2.5 cm by 5.0 cm strip of platinized niobium expanded mesh were immersed in 200 mls of de-ionized (DI) water. The silver and platinum strips were separated by 0.5 mm thick polypropylene mesh and are electrically connected via a volt/ampere meter. The solution was agitated with a magnetic stirrer while a dilute solution of sodium hypochlorite was titrated into the DI water. The potential (voltage) and the current between the metals was recorded as a function of sodium hypochlorite concentration. The results for pH 7.0, 7.5, and 8.0 are shown in FIG. 1.

Figure 2:
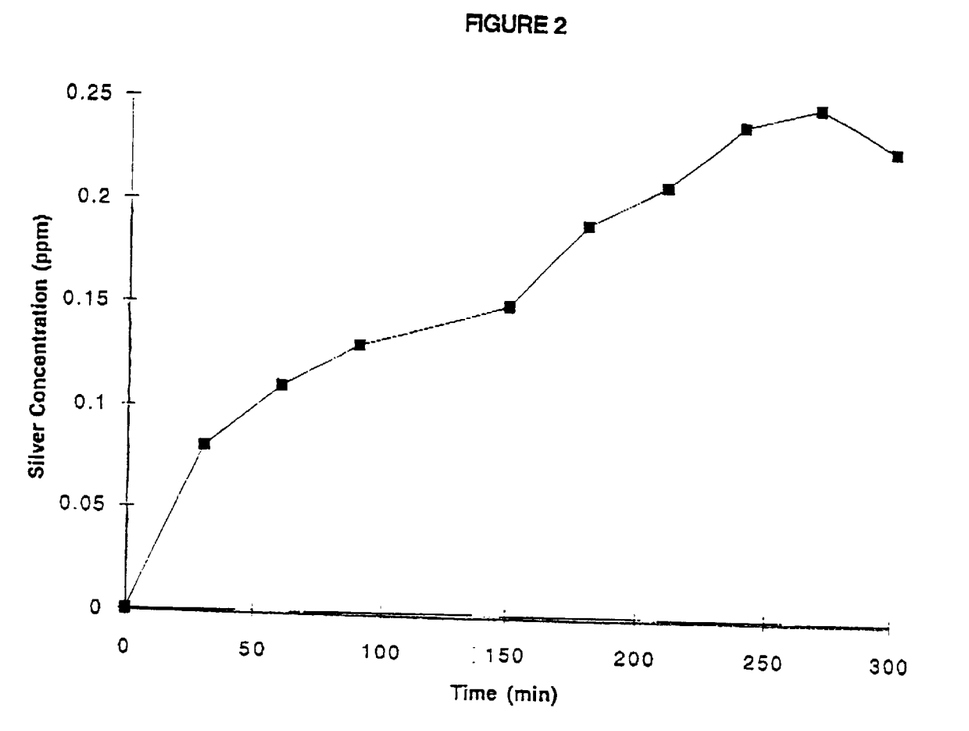
FIG. 2 is a plot of the silver concentration as a function of time during the galvanic cell reaction between platinum and silver.

For a second example, a strip of 2.5 cm by 5.0 cm silver metal and 2.5 cm by 5.0 cm strip of platinized niobium expanded mesh was immersed in 200 mls of DI water containing 5.25 ppm of sodium hypochlorite. The solution pH is 7.5. The silver and platinum strips were separated by 0.5 mm thick polypropylene mesh and were electrically connected via a volt/ampere meter. The solution was agitated with a magnetic stirrer. The potential was 0.47 V and the current was 0.066 mA. The solution was analyzed for silver every 30 minutes using an Atomic Adsorption spectrometer. The results are shown in FIG. 2. The measured silver dissolution rate is 5% to 15% of the theoretical amount calculated from the measured current.

Figure 3:
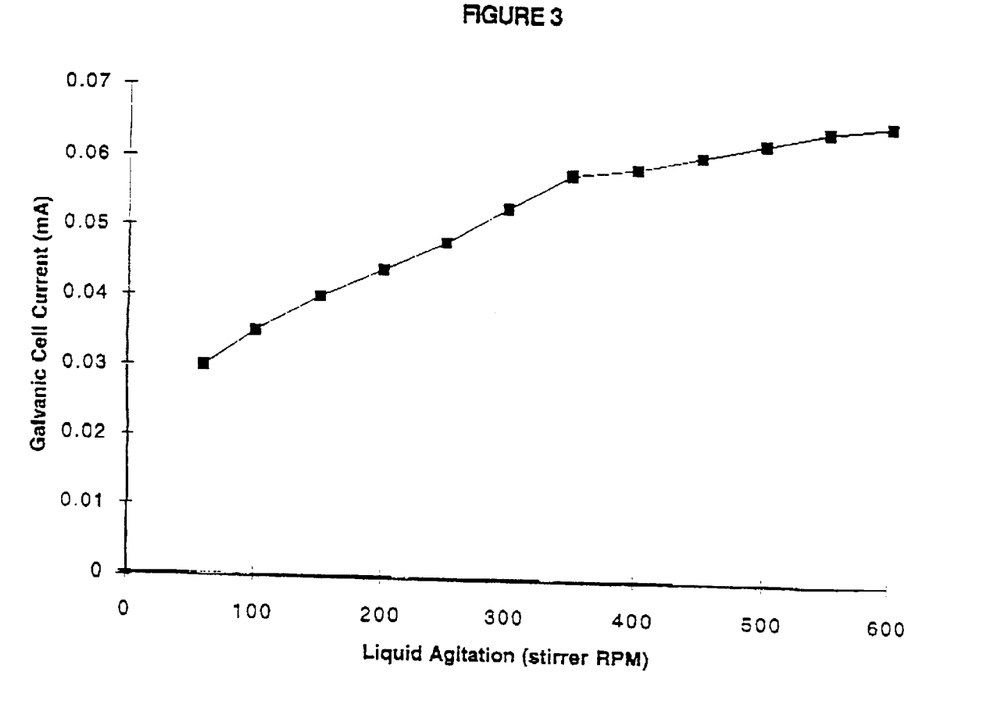
FIG. 3 is a plot of the current between silver and platinum as a function of liquid agitation.

As a third example, a strip of 2.5 cm by 5.0 cm silver metal and a 2.5 cm by 5.0 cm strip of platinized niobium expanded mesh were immersed in 200 mls of DI water containing 5.25 ppm of sodium hypochlorite. The solution pH was 7.5. The silver and platinum strips were separated by 0.5 mm thick polypropylene mesh and were electrically connected via a volt/ampere meter. The solution was agitated with a magnetic stirrer. The stir bar rotation rate was varied and the corresponding current was recorded to determine the dependence of silver dissolution on the liquid shear rate. The results are shown in FIG. 3.

Figures 5, 5A, 5B:
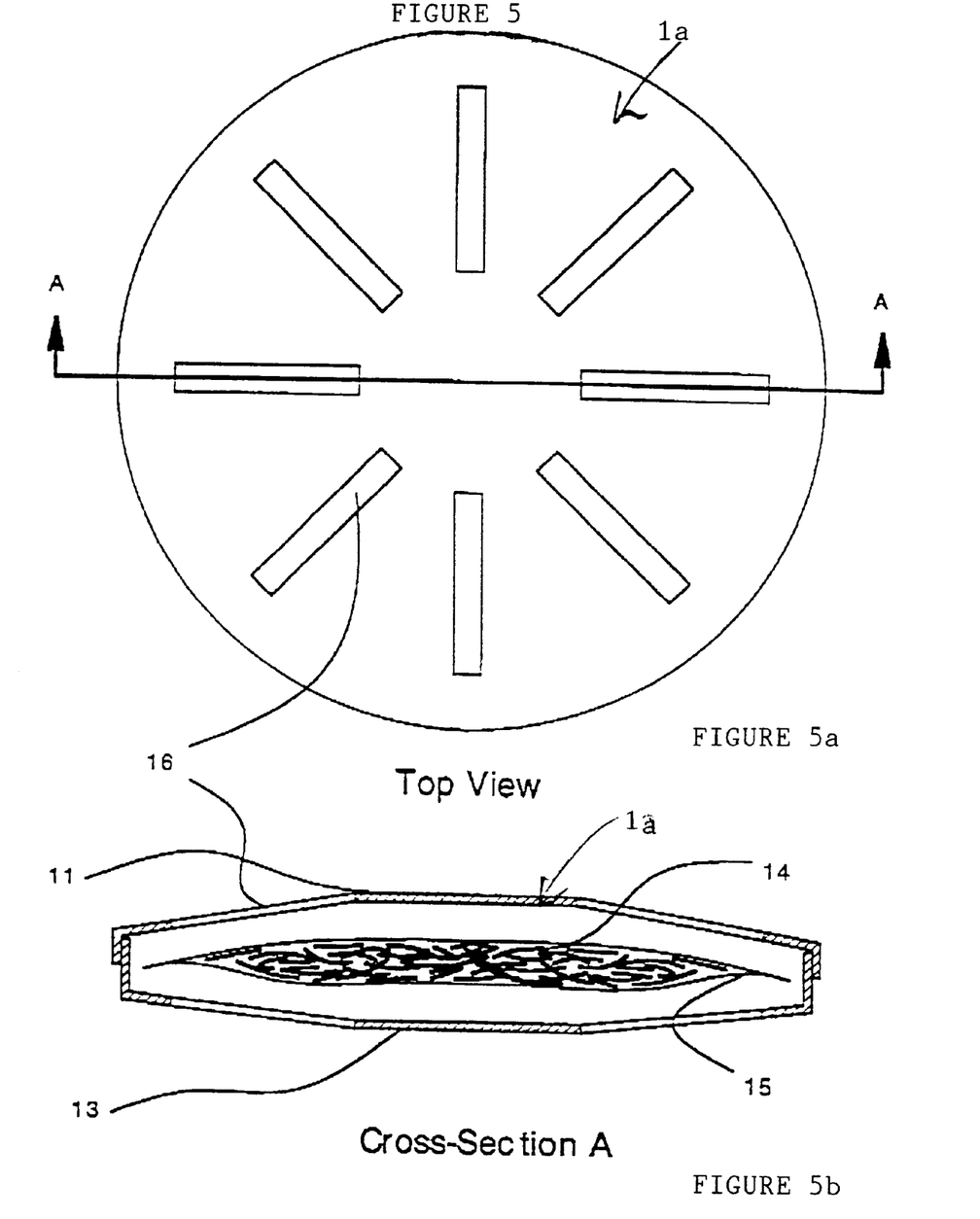

Now, turning in greater detail to the two embodiments of the invention depicted in the appended drawings, FIG. 5 shows one possible implementation of a galvanic cell 1a of the current invention. A mixed packing of strips of platinized foil and silver foil 14 is retained in a plastic mesh pouch 15. The plastic pouch is contained in a hard case with top and bottom sections 11 and 13 respectively. Both the top 11 and bottom 13 sections have slots 16 to allow liquid flow through the case. The device may be placed below the skimmer basket of the pool or in the inlet strainer of the filter pump.

Figures 6, 6A:
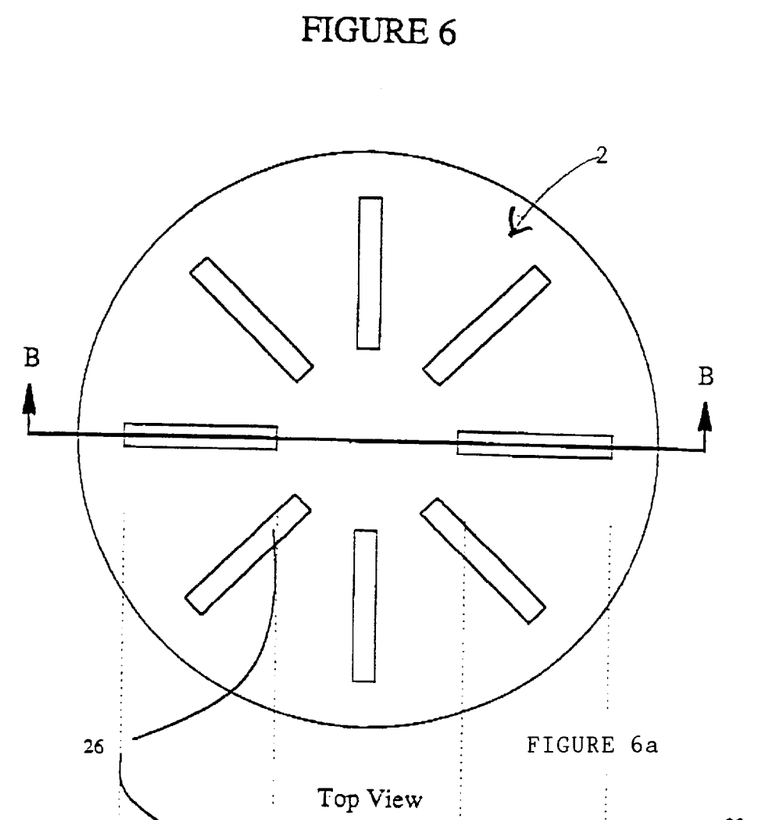
Figure 6B:
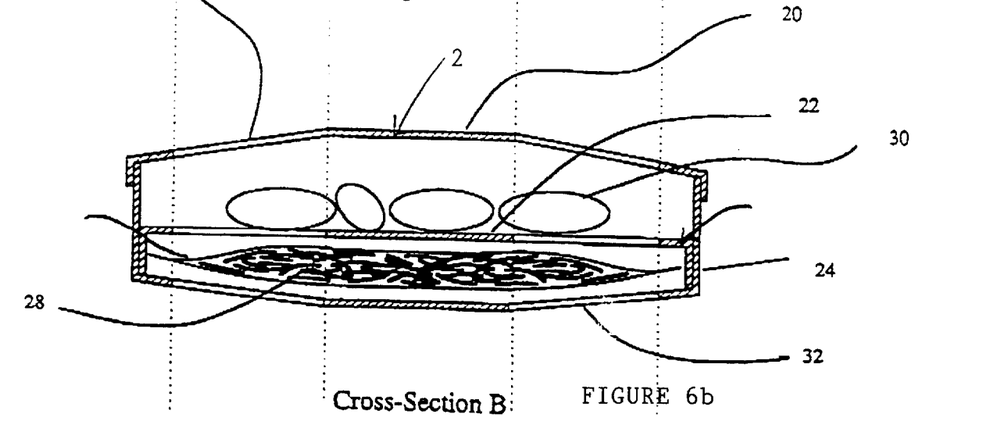

FIG. 6 illustrates an embodiment of the current invention in which the galvanic cell 1a is incorporated into a chlorine dispenser 2. An outer casing consists of two sections 20 and 24. A mixture of platinized and silver foil strips 28 is encapsulated by a plastic mesh pouch 34. The mesh pouch 28 is separated from the hypochlorite tablets 30 by a divider 22. The outer casing and the divider have slots 26 which allow the water to circulate through the enclosure. The top section of the device 20 is removable to allow the user to replenish the hypochlorite tablets 30. The device may be placed in the skimmer basket of the pool or in the inlet strainer of the filter pump, or alternatively may simply be placed anywhere below the water surface.

Basic start-up instructions for the use of the galvanic sanitizer that is the present invention are as follows:

First, clean the debris and algae from the pool and equipment.

Second, balance the pool water as normal.

Third, add one unit (packet) of the preferred integral package 2 (shown in FIG. 6) to the poll skimmer. The unit packet preferably contains (i) oxidizing agent in the form of powdered, granulated or caked chlorine, (ii) a 2.5 cm.×5 cm foil incorporated within a galvanic cell, and, optionally, (iii) an algaecide in the form of chelated copper and/or (iv) a phosphate-removing compound—all in accordance with the present invention—for every 25,000 gallons of pool water.

The preferred powdered, granulated or caked chlorine is preferably applied in sufficient quantity so as to produce a chlorine ion concentration of 0.2 to 1.0 ppm.

On the basis of (i) one 2.5 cm.×5 cm foil (part of the galvanic cell) per each 25,000 gallons of pool water, a 100,00 gallon pool would have, by way of example, four foils in a single galvanic cell. The foils may in particular be four 2.5 cm. by 5 cm. silver leaf rectangles enclosed in a flat nylon mesh as the anode of the galvanic cell, with a 5 cm by 7 cm palladium coated perforated steel rectangle acting as support for these silver leaf rectangles and as the anode of the galvanic cell.

The optional (iii) chelated copper algaecide may be added to manufacturer's recommendations. With the control of algae growth provided by other components, the chelated copper will not be taken up by, nor disposed as part of, any algae growth—which algae will not grow, or at least grow well, in the first place—and will accordingly be long persisting.

The optional (iv) phosphate-removing compound—preferably lanthanum carbonate in form of the No Phos product of Natural Chemistry, Inc.—is used in quantity from 1–15 oz. per 100,000 gallons monthly. Just as with algaecide, consumption is slow, and prolonged, relative to usage rates of the prior art. Clearly what seems to be transpiring is that each chemical is supporting the anti-microbial, anti-life operational—if not the chemical—effectiveness of every other chemical. A synergistic water treatment effect is experienced.

A whole new packet of these chemicals is normally added only once at the beginning of each season.

Fourth, after approximately 14 days, begin to cut back on chlorine usage.

Thus the most preferred improved water treatment method, such as for swimming pools and spas, of the present invention uses (i) a chemical oxidizing agent such as chlorine or bromine, (ii) the silver matrix previously described, and, optionally, (iii) an algaecide such as a chelated copper compound and/or (iv) a phosphate-removing compound.

Most preferably the algaecide especially, and preferably all chemicals, are introduced into the water at a measured rate, for example by using a metering device. The oxidizing agent is most preferably introduced into the water at a measured rate by slowly dissolving a water soluble solid form of the oxidizing agent using a pre-determined water-flow rate or by using a metering device. Optionally, the oxidizing agent would be introduced into the water up-stream of the silver matrix. Understand also that an increased concentration of the oxidizing agent will serve to increase the dissolution rate of silver from the matrix. Since these are the two principal, essential and synergistically interactive water treatment components of the present invention, it is interesting, and satisfying, to note that when conditions dictate the increased use of the oxidizing agent—such as to control a microbial eruption—then so also do the metal ions usefully increase in density.

The preferred treatment method would have the benefit of destroying a broad spectrum of microorganisms (including bacteria and algae), oxidizing organic contaminants from the water (thereby robbing microorganisms of their food source), and reducing the use of the chemical oxidizing agents themselves (for example, reducing the need for chlorine use from 1 to 3 parts per million to 0.25 to 0.75 parts per million). The typical bromine pool concentration corresponding to 1–3 ppm chlorine is 2–4 ppm bromine, and if bromine is used then it is reduced equivalently, i.e., to about ¼ normal levels.

Reducing the use of the chemical oxidizing agents is desirable because the agents are generally irritating to eyes, skin, and mucous membranes and the agents may have deleterious environmental effects from their evaporation into the air or introduction into natural water-ways.

The preferred phosphate-reducing agent is the No Phos product made by Natural Chemistry in Stamford Conn. The active ingredient of No Phos is lanthanum carbonate (a solid). The lanthanum carbonate is ground down and suspended in a slurry, which is how the product is sold. The product settles on storage and needs mixing prior to application. For maintenance, the manufacturer suggests using 5 oz slurry/10,000 gallons of water each week. The product is normally poured into the skimmer from where it goes to the pool filter where it gets imbedded and actually does its work. For use in the present invention the No Phos product is dispensed as discussed hereinafter.

At the start of the a season of poll maintenance, the starting recommended dosage level of No Phos for a phosphate starting level of from 300–600 ppm is 16 oz. No Phos, from 600–900 ppm is 32 oz. No Phos, and for >900 ppm is 48 oz. No Phos. Natural Chemistry claims the that issued U.S. Pat. No. 5,683,953, and pending U.S. patent application Ser. No. 08/519,890, are in coverage of the No Phos product.

In use with the preferred dispenser of the present invention discussed hereinafter, the No Phos granules of the lanthanum carbonate are used to fill a cartridge which, as held within a chamber of a housing, has the pool/spa water pass through the granules. The cartridge is thus something like the activated charcoal filters used in home water purifiers. The cartridge is loaded with from 1–15 oz. of lanthanum carbonate for one month's service, depending upon conditions. Both silver ion and chlorine cartridges, as are themselves within separate chambers of the preferred dispenser, are down-stream of the lanthanum carbonate.

Because the lanthanum carbonate (the active ingredient in the No Phos slurry) does not dissolve in the water but rather acts like filtration media (like activated carbon), the preferred way of using the lanthanum carbonate would be in a cartridge similar to the activated carbon cartridges found in home water purifiers, either upstream or separate from the metal ion and oxidizer.

In a preferred embodiment of the invention, the three chemical entities (namely the silver matrix, algaecide, and oxidizing agent) are housed in multiple devices plumbed into the water line to be treated. Each device is designed to optimize the rate of introduction of the water-soluble active ingredient of each chemical entity. This optimization is accomplished through selection of the metering methodology and/or flow rate of water through the device. The water line to be treated may be part of the recirculation system of a swimming pool or spa.

In a second embodiment of the invention, two of the three chemical entities are housed in a single device. Preferably the chemical entities themselves are housed in separate chambers within the device to prevent any adverse or undesirable interaction between the chemical entities.

In a third embodiment of the invention, all three of the chemical entities are housed in a single device. Again, preferably the chemical entities themselves are housed in separate chambers within the device to prevent any adverse or undesirable interaction between the chemical entities.

As a first test of the efficacy of the synergistic combination of the preferred embodiment of the present invention, the bacteriological control ability of chlorine alone was compared to chlorine with silver supplementation for a swimming pool application. A "side by side" comparison in about 50 gallons of artificial pool water was conducted.

To set up the test, two 55 gallon drums were filled with water and adjusted to pH 7.4–7.6, total alkalinity 80–100 ppm, and calcium hardness 200 ppm. Each test drum ("spa") was fitted with a chlorine feeder. These feeders were set to maintain a free chlorine residual of 0.5 ppm. The feeders were designed to feed granulated sodium dichloro-S-triazinetrione, Dihydrate ("dichlor") Because of the very small water volume, the dichlor was first dry blended with borax at a ratio of one part dichlor to 30 parts borax.

The silver matrix of the galvanic cell was comprised of a 2½ in. by 3 in. palladium coated perforated steel rectangle a support for four ½ in. by 2 in. silver leaf rectangles. The matrix was enclosed in a flat nylon mesh. The silver matrix was suspended in one vessel away from contact with any metallic or conductive surfaces. Both vessels were set-up with the chlorine feeders set to maintain the chlorine residual at 0.5 ppm. The silver matrix was "activated" by spiking the water for 3 days with extra chlorine to achieve a once daily 1.5 ppm chlorine spike. (Alternatively, the water with the silver pack could have been maintained at an even 1 ppm chlorine for three days). After 3 days and when the concentration of chlorine in the two vessels equaled 0.5 ppm, the bacteria testing was begun. Chlorine concentrations fluctuated during the course of the test from 0.1 ppm to 0.8 ppm.

The test was run for 10 days from the first addition of the bacteria E. coli. Daily, each water vessel was treated with 2 ml/50 gal of Trypicase soy broth to serve as a synthetic bather load. A bacteria load was then added daily at a rate of 10 organisms (cfu) per ml of water.

After addition of the bacteria, the organisms were enumerated at ten minutes, sixty minutes and twenty-four hours post addition. The pH and chlorine residual were measured at each sampling and recorded.

The test demonstrated that the drum containing the silver matrix and low chlorine residual was more effective than the chlorine residual alone in destroying E. coli. Further, it was found that the enhanced killing effect lasted for about 48 hours after removal of the silver matrix from the drum, after which time the killing effect of both drums became equivalent.

Figure 7A:
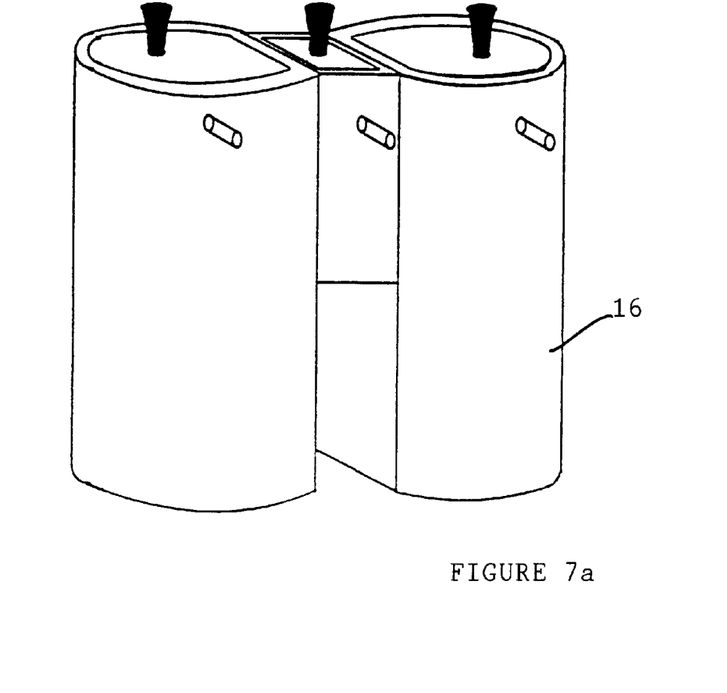
Figure 7B:
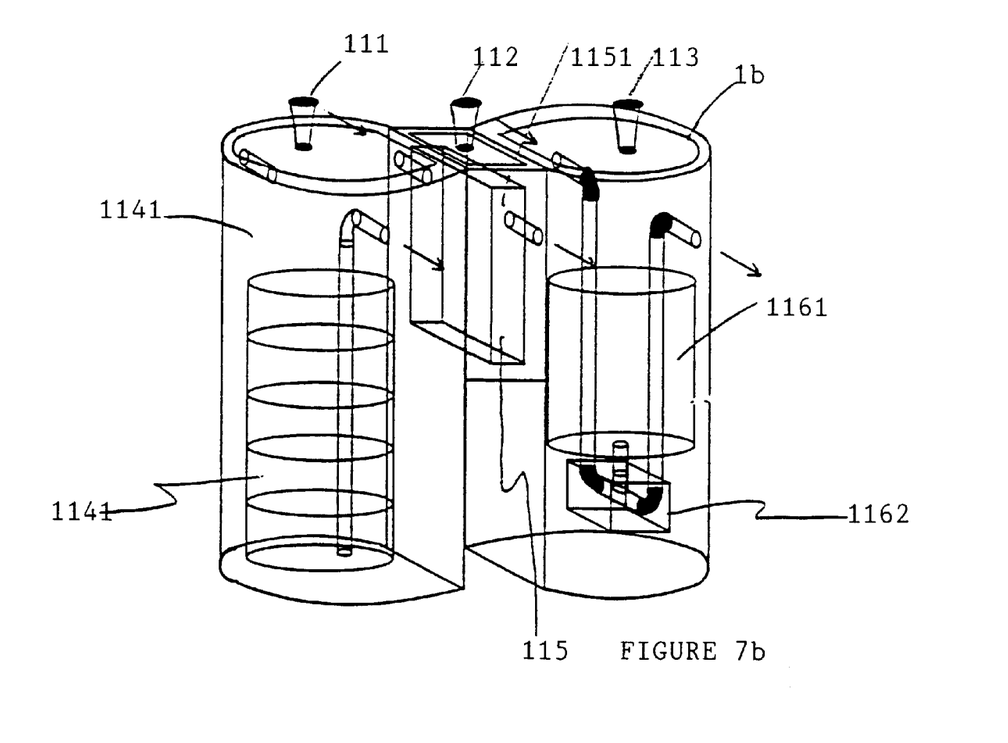

A diagrammatic view of a preferred integrated disposable cartridge housing the various components of the preferred water treatment system of the present invention is shown in FIGS. 7a and 7b. The dispenser 1b is placed in the water recirculation path of a pool or spa during use, such as insertion into a fixed housing plumbed into the pool or spa recirculation system. Portals 111, 112 and 113 provide flow communication. The upstream chamber 114 contains an oxidizing chemical, normally in the form of oxidizer cakes 1141 that are most typically and preferably chlorine cakes. The cakes 1141 slowly dissolve to place oxidizing agent (chlorine) in the flow of recirculating water that is next ported to the middle chamber 151 in which is contained the galvanic cell 1151 of preferred construction. The recirculating water, which now contains metal (preferably silver) ions liberated from the galvanic cell 1151 is passed back to the pool or spa. Pool or spa water is circulated to the third chamber 116 in which is present a dispenser 1161 of algaecide and/or phosphate-reducing chemicals. If these chemicals are in liquid form, as is typical, then their controlled dispensing and uptake may be effected by the venturi 1162, which slowly drains liquid algaecide and/or phosphate-reducing chemicals from the supply within dispenser 1161 into the circulating water. Water with a high concentration of oxidizer is not normally circulated through the third chamber 116 due to the possibility of adverse chemical reaction.

In accordance with the preceding explanation, variations and adaptations of the water purification device in accordance with the present invention will suggest themselves to a practitioner of the water sanitization arts.

For example, various different chemical oxidizing agents and algaecides may be used interchangeably. It is theoretically possible to suspend use of the galvanic cell, and the production of the metal ions, until the concentration of the oxidizing agent (e.g., the chlorine) has fallen off to a predetermined lower value, the addition of the metal ions (and/or the algaecide) only then commencing. This is, however, not preferred.

In accordance with these and other possible variations and adaptations of the present invention, the scope of the invention should be determined in accordance with the following claims, only, and not solely in accordance with that embodiment within which the invention has been taught.

What is claimed is:

1. A method of treating the water of a pool or spa receiving ongoing organic contamination, the method comprising:

first-introducing at predetermined rate a chemical oxidizing agent insufficient to inhibit the growth of bacteria without the presence of metal ions but perpetually sufficient to inhibit the growth of bacteria in continuing presence of metal ions so long as the first-introducing is continued; and second-introducing metal ions into the water sufficient to inhibit the growth of bacteria should the first-introducing of the chemical oxidizing agent cease, and after such time as previously first-introduced chemical oxidizing agent is effectively completely consumed, but then only for a period of time, which period is at least twice as long as would otherwise be the case should the metal ions have never been present but which period is not perpetual, upon expiration of which period bacteria will ultimately grow in absence of the chemical oxidizing agent despite continuing second-introducing and continuing presence of the metal ions.

2. The water treatment method according to claim 1 wherein the second-introducing of (ii) the metal ions into the water is sufficient to inhibit the growth of bacteria for at least twenty four hours after first-introducing of the chemical oxidizing agent ceases and after a time when previously first-introduced chemical oxidizing agent is effectively completely consumed, which twenty four hour period is at least twice as long as would otherwise be the case should the second-introduced metal ions have never been present.

3. The water treatment method according to claim 1 further comprising:

third-introducing an algaecide sufficient to inhibit the growth of algae should (1) first-introducing of the chemical oxidizing agent cease, and after such time as previously first-introduced chemical oxidizing agent is effectively completely consumed, then (2) second-introducing of the metal ions then immediately also cease, but then only for a period of time, which period is longer than would otherwise be the case should the algaecide have never been present but which period is not perpetual, upon expiration of which period algae will ultimately grow in absence of the first-introduced chemical oxidizing agent and the second-introduced metal ions despite any continuing introducing and continuing presence of the third-introduced algaecide;

wherein the third-introducing of algaecide is not so much for primary control of algae growth, which the third-introducing alone cannot realize, as for the prolongation of the period in which algae growth will not escalate when primary inhibitors thereto become absent.

4. The water treatment method according to claim 3 wherein the third-introducing of the algaecide into the water is sufficient to inhibit the growth of algae for at least twenty four hours after first-introducing of the chemical oxidizing agent and second-introducing of the metal ions have both ceased, which twenty four hour period is at least twice as long as would otherwise be the case should the third-introduced algaecide have never been present.

5. The water treatment method according to claim 3 wherein the third-introducing is of an algaecide consisting essentially of chelated copper and compounds of chelated copper.

6. The water treatment method according to claim 3 further comprising:

fourth-introducing a phosphate-reducing compound sufficient to inhibit the growth of algae should first-introducing of the chemical oxidizing agent cease, and after such time as previously first-introduced chemical oxidizing agent is effectively completely consumed, and then both the second-introducing of the metal ions and the third-introducing of the algaecide both also cease, but then only for a short period of time, which period is longer than would otherwise be the case should the fourth-introduced phosphate-reducing compound have never been present but which period is not perpetual, upon expiration of which period algae will ultimately grow in absence of the first-introduced chemical oxidizing agent and the second-introduced metal ions and the third-introduced algaecide despite the presence of the fourth-introduced phosphate-reducing compound;

wherein the fourth-introducing of the phosphate-reducing compound is not so much for primary control of algal growth, which the fourth-introducing alone cannot realize, as for the prolongation of the period in which algal growth will not escalate when primary inhibitors thereto become absent.

7. The water treatment method according to claim 3 applied to circulating water of a pool or spa wherein each of the first-introducing of the chemical oxidizing agent, the second-introducing of the metal ions, and the third-introducing of the algaecide arises from a physically separate device located within the circulating water of the pool or spa.

8. The water treatment method according to claim 3 applied to circulating water of a pool or spa wherein two of the first-introducing of the chemical oxidizing agent, the second-introducing of the metal ions, and the third-introducing of algaecide arise from one, first, device within the circulating water of the pool or spa; and wherein the introducing of a remaining one of the first-introducing of the chemical oxidizing agent, the second-introducing of the metal ions, and the third-introducing of the algaecide arises from another, physically separate, second device within the circulating water of the pool or spa;

wherein two or three separate devices are each consumable and replaceable in introducing all of (i) the chemical oxidizing agent, (ii) the metal ions, and (iii) the algaecide into the pool or spa.

9. The water treatment method according to claim 3 applied to circulating water of a pool or spa wherein the first-introducing of the chemical oxidizing agent, the second-introducing of the metal ions, and the third-introducing of the algaecide respectively arise from three separate chambers within a single device within the circulating water of the pool or spa;

wherein the first-introducing of the chemical oxidizing agent, the second-introducing of the metal ions, and the third-introducing of the algaecide are conducted separately, and from separate chambers; and wherein one, two or three devices are separately consumable and replaceable in introducing all of (i) the chemical oxidizing agent, (ii) the metal ions, and (iii) the algaecide into the pool or spa.

10. The water treatment method according to claim 1 wherein the second-introducing is of metal ions consisting essentially of silver and copper and zinc.

11. The water treatment method according to claim 10 wherein the second-introducing is of silver metal ions derived from a galvanic cell having a first metal drawn from the group of silver and copper and zinc, in physical and electrical contact with a second metal having a higher electrochemical potential than does the first metal, immersed in the water rendered electrically conductive by the presence of ions.

12. The water treatment method according to claim 10 wherein the second-introducing is of silver metal ions derived from a galvanic cell with a first and a second metal wherein at least one of the first metal and the second metal is in the form a planar mesh while the other metal is in a planar form laid flat against the mesh;

wherein openings within the at least one metal mesh permit circulation of water so that ions may readily come into contact with both the first and the second metals where there is little distance between them; and wherein by galvanic action an effective amount of the first metal is liberated into the water so as to inhibit the growth of bacteria, fungi and algae.

13. The water treatment method according to claim 10 wherein the second-introducing is of silver metal ions; and wherein said second-introducing is derived from a galvanic cell having a second metal consisting essentially of a metal of the platinum group.

14. The water treatment method according to claim 1 wherein the first-introducing is of a chemical oxidizing agent drawn from the group consisting essentially of chlorine;

wherein the second-introducing of silver metal ions derived from a galvanic cell by action of which chlorinated water is rendered electrically conductive by the presence of chlorine ions.

15. The water treatment method according to claim 1 wherein the first-introducing is of a chemical oxidizing agent drawn from the group consisting essentially of chlorine and bromine.

16. The water treatment method according to claim 1 wherein the first-introducing is of a chemical oxidizing agent dissolved from a water soluble solid form of oxidizing agent.

17. The water treatment method according to claim 1 applied to circulating water of a pool or spa wherein the first-introducing of the chemical oxidizing agent transpires upstream in the circulating water of the pool or spa from the second-introducing of the metal ions.

18. The water treatment method according to claim 1 further comprising:

third-introducing phosphate-removing compounds.

19. A replaceable consumable device insertable in a recirculation flow path of a pool or a spa for treating the water of the pool or the spa which pool or spa receives ongoing organic contamination, the device comprising:

a first means for introducing at predetermined rate (i) a chemical oxidizing agent, and a second means for introducing at predetermined rate (ii) metal ions;

wherein an amount of (i) the chemical oxidizing agent introduced into the water by the first means is insufficient to inhibit the growth of bacteria without the presence of (ii) the metal ions, but is perpetually sufficient to inhibit the growth of bacteria in continuing presence of (ii) the metal ions introduced by the second means; and wherein an amount of (ii) the metal ions introduced into the water by the second means is sufficient to inhibit the growth of bacteria should introducing of the chemical oxidizing agent by the first means cease, and after such time as previously introduced chemical oxidizing agent is effectively completely consumed, but then only for a period of time, which period is at least twice as long as would otherwise be the case should the metal ions have never been present but which period is not perpetual, bacteria ultimately growing in absence of the chemical oxidizing agent despite continuing introducing and continuing presence of the metal ions.

20. The water treatment device according to claim 19 wherein the second means comprises:

a galvanic cell having a first metal drawn from the group of silver and copper and zinc, in physical and electrical contact with a second metal having a higher electrochemical potential than does the first metal, immersed in the recirculating water rendered electrically conductive by the presence of ions.

21. The water treatment device according to claim 19 wherein the introducing of (ii) the metal ions into the water by the second means is sufficient to inhibit the growth of bacteria for at least twenty four hours after introducing of the chemical oxidizing agent by the first means ceases and after a time when previously introduced chemical oxidizing agent is effectively completely consumed, which twenty four hour period is at least twice as long as would otherwise be the case should the metal ions have never been present.

22. The water treatment device according to claim 19 wherein the device farther comprises:

a third means for further introducing (iii) an algaecide;

wherein an amount of (iii) the algaecide introduced into the water by the third means is sufficient to inhibit the growth of algae should introducing of the chemical oxidizing agent by the first means cease, and after such time as previously introduced chemical oxidizing agent is effectively completely consumed, but then only for a period of time, which period is longer than would otherwise be the case should the algaecide have never been present but which period is not perpetual, algae ultimately growing in absence of the chemical oxidizing agent despite continuing introducing of the metal ions by the second means.

23. The water treatment device according to claim 19 wherein the first means comprises:

a solid form of water soluble chemical oxidizing agent dissolving over time to introduce chemical oxidizing agent into the water.

24. A water purification system, insertable within a flow of recirculating water of a pool or spa, comprising:

a porous package; containing a consumable galvanic cell producing metal ions;

a consumable water-soluble chemical oxidizing agent in an amount that is intentionally consumed before the galvanic cell is consumed; and an algaecide.

25. (Restated) The water purification system according to claim 24 wherein the chemical oxidizing agent comprises:

a solid form of water soluble chemical oxidizing agent dissolving over time to introduce chemical oxidizing agent into the water.

26. The water purification system according to claim 24 wherein the galvanic cell comprises:

a first metal drawn from the group of silver and copper and zinc, in physical and electrical contact with a second metal having a higher electrochemical potential than does the first metal, immersed in the recirculating water rendered electrically conductive by the presence of ions.

* * * * *